United States Patent Office 2,926,707
Patented Mar. 1, 1960

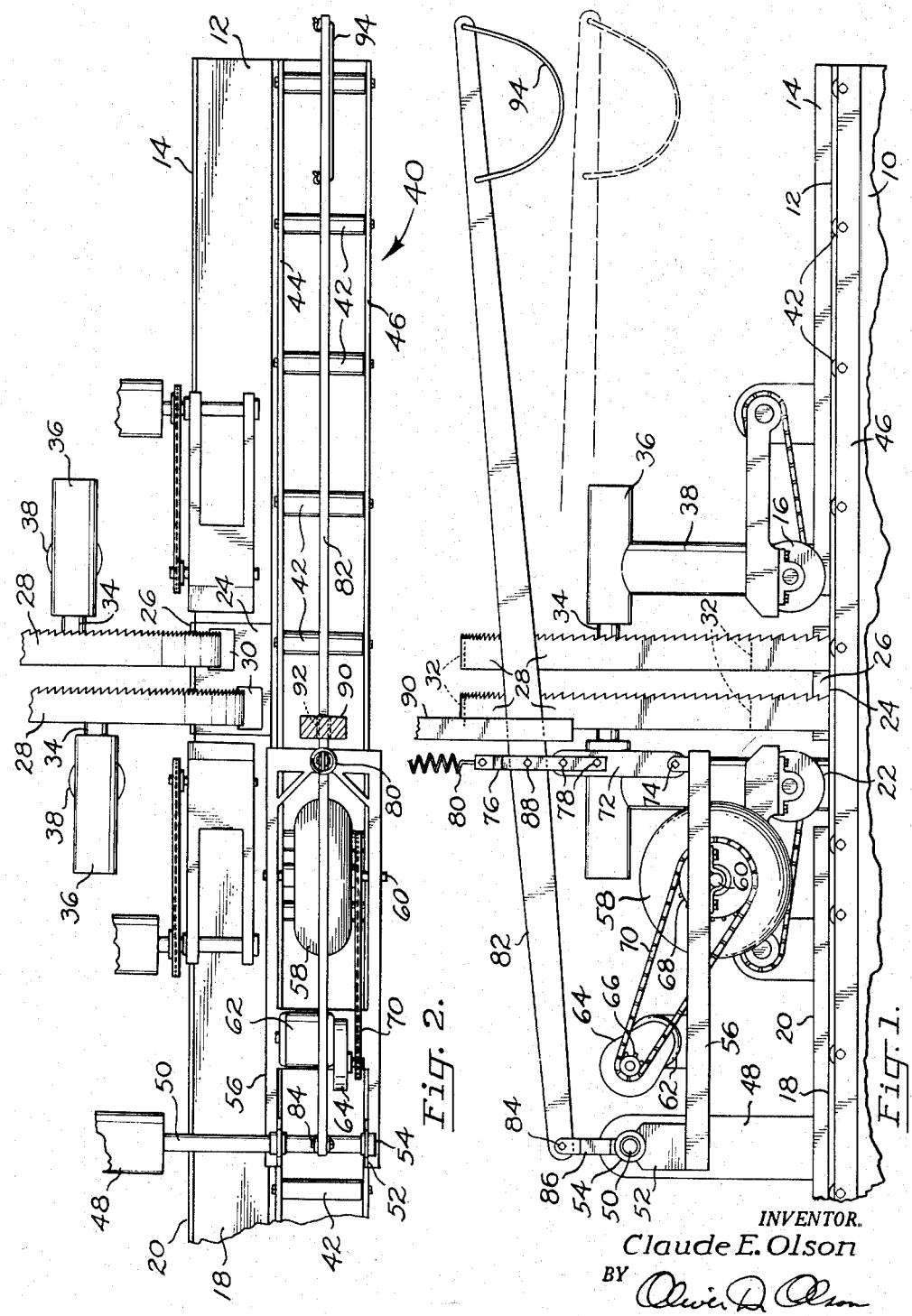

2,926,707
LUMBER RETURN SYSTEM

Claude E. Olson, Dorris, Calif., assignor to The Dorris Lumber and Moulding Company, Sacramento, Calif., a corporation of California Application January 2, 1958, Serial No. 706,758

2 Claims. (Cl. 143—92)

This invention pertains to lumber cutting apparatus, and relates particularly to mechanism for returning the uncut portion of lumber to the operator of a rip saw.

In the reduction of lumber to small dimensions, as for example in the manufacture of moldings, the lumber is passed through one or a plurality of spaced rip saws. The uncut portion of the lumber is re-cycled and passed through the rip saws until the lumber is reduced to desired dimensions. Conventional procedure in the operation of a rip saw requires three persons, namely one operator to feed the lumber through the rip saws, a second to remove the cut lumber and a third to return the uncut lumber to the operator. This procedure has two principal disadvantages. First, it is expensive from a labor standpoint, in the requirement for a third person to return the uncut lumber to the operator. Second, it presents a serious hazard to the operator in not having direct control over the return of lumber. In this latter respect, serious accidents have occurred to operators when struck by returning lumber, as when their attentions were directed to other activities.

Accordingly, it is a principal object of the present invention to provide a work return system which is under the complete control of the feed operator, thus eliminating the possibility of accident.

Another important object of this invention is the provision of lumber return mechanism which is operable solely by the operator and thus eliminates the necessity for a third person.

Still another important object of the present invention is the provision of a lumber return system which is adaptable for installation and use with all types of lumber cutting apparatus.

A further important object of this invention is to provide lumber return mechanism which is of simplified construction for economical manufacture, which may be installed with speed and facility for cooperation with conventional lumber sawing apparatus.

The foregoing and other objects and advantages of this invention will appear from the following detailed description taken in connection with the accompanying drawing, in which:

Fig. 1 is a fragmentary view in side elevation of rip saw apparatus having associated therewith a lumber return system ebdoying the features of the present invention; and Fig. 2 is a fragmentary plan view of the assembly shown in Fig. 1.

The lumber return system of the present invention is illustrated in the drawing in association with lumber rip saw apparatus which includes a main frame 10 supporting an infeed table 12 with its lumber guide 14 and associated power driven feed roll 16, and the outfeed table 18 with its associated lumber guide 20 and power driven outfeed roll 22. Positioned between the infeed and outfeed tables is a saw table 24, also provided with a lumber guide 26. The supporting surface of the saw table and its lumber guide are aligned with the supporting surfaces and lumber guides of the infeed and outfeed tables.

In the embodiment illustrated there is associated with the saw table a pair of band saws 28, the working stretches of which project through openings 30 in the saw table. Each of the band saws is supported at its opposite ends on rolls 32, the lower one of which (not shown) is power driven in conventional manner. The upper rolls are supported for rotation on shafts 34 mounted in the bearings 36 carried at the upper ends of the vertical standards 38. It will be understood that the band saws are adjustable, independently of each other, laterally with respect to the saw table, in order to vary the thickness of cuts to be made in the lumber.

In accordance with the present invention, there is associated with the illustrated rip saw assembly a lumber return system which preferably is under the complete control of the operator positioned adjacent the infeed end of the infeed table. Accordingly, an elongated return conveyor 40 is positioned adjacent and parallel to the infeed and outfeed tables. Although this conveyor may take any one of several forms, the preferred construction illustrated in the drawing includes a plurality of longitudinally spaced idler rolls 42 supported between laterally spaced longitudinal frames 44 and 46, preferably adapted for attachment to the main frame 10 of the rip saw assembly. The idler rolls of the conveyor preferably are aligned with the supporting surface of the infeed and outfeed tables, to facilitate transfer of lumber from the outfeed table onto the conveyor rolls.

Mounted upon an upstanding section 48 of the main frame is a horizontal shaft 50 which extends across the conveyor 40. Brackets 52 are journaled on the shaft by means of bearings 54, and these brackets support one end of a framework 56. A traction wheel 58, such as the rubber tire illustrated, is mounted for rotation on the framework, as by means of the axle 60, and the wheel is driven by such means as the electric motor 62 and associated gear reduction unit 64, sprockets 66, 68 and chain 70. The wheel is positioned vertically above the conveyor and is supported for vertical adjustment relative to the conveyor. In the embodiment illustrated, such support is provided by means of a link 72 which is pivoted at its lower end to the framework as by means of the pivot bolt 74. A pair of straps 76 are removably secured to opposite sides of the link, as by means of the bolts 78, and extend upwardly therefrom. A resilient spring 80 interconnects the upper ends of the straps and a structural member of the sawmill building (not shown), to maintain the framework and supported wheel resiliently in a normal position elevated above the conveyor rolls, as illustrated in Fig. 1.

An operating lever 82 is mounted pivotally at its rearward end, i.e. the end facing the outfeed end of the rip saw assembly, as by means of the pivot pin 84 extending between the spaced brackets 86 which project upwardly from the shaft 50. The operating lever extends forwardly between the spaced straps 76 and is secured pivotally to the latter, as by means of the pivot bolt 88. A stop member 90, illustrated as an elongated beam, is secured to a structural member of the sawmill building and projects downwardly therefrom. The lower end of this beam is provided with a slot 92 to receive the operating lever 82 therein, the inner end of the slot forming an abutment which determines the upper limit of elevation of the wheel 58 above the conveyor rolls.

The operating lever extends forwardly to a position adjacent the operator's station at the infeed end of the infeed table, and preferably is provided with a loop handle 94 arranged for convenient access to the operator.

The operation of the lumber return system described hereinbefore is as follows: The operator stands at the infeed end of the infeed table 12 and feeds a board to the spaced rip saws, it being understood that the edge of the board abuts the guide plate 14 and that the power driven rolls 16, 22 draw the board through the saws and onto the outfeed table 18. A second person, stationed at the outfeed table, moves the uncut portion of the lumber laterally from the outfeed table onto the conveyor rolls 42, vertically below the power driven wheel 58, and then directs the cut pieces of lumber to the next stage of operation.

When the operator is ready to have the uncut portion of lumber returned to him for repassage through the rip saws, he pulls downward on the forward end of the lever 82, whereupon the framework 56 is pivoted in a clockwise direction about the shaft 50. The power driven wheel 58 thus is brought into contact with the upper surface of the lumber resting on the conveyor, and since the wheel is rotating in the direction of the arrow indicated in Fig. 1, the lumber is driven toward the right, i.e. back to the position of the operator.

By virtue of the arrangement described hereinbefore it will be apparent that the complete rip saw assembly may be operated with maximum efficiency by only two persons, namely the lumber feed operator and the off bearer. Furthermore, return of the uncut lumber is controlled completely by the operator, thus eliminating the dangers described hereinbefore. Still further, the lumber return system of this invention is of simplified and therefore economical construction and is readily adaptable for association and use with all types of conventional lumber cutting equipment.

It will be apparent to those skilled in the art that various changes in the details of construction described hereinbefore and adaptation to other uses may be made without departing from the scope and spirit of this invention. Accordingly, it is to be understood that the foregoing description is primarily illustrative of the invention and is not to be considered as limiting the scope of the appended claims.

Having now described my invention and the manner in which the same may be used, what I claim as new and desire to secure by Letters Patent is:

1. For use with a saw or the like having infeed and outfeed sections, a lumber return system comprising an elongated unpowered conveyor adapted to be positioned adjacent and substantially parallel to the infeed and outfeed sections of a saw or the like, a power driven rotary traction wheel supported above the conveyor for vertical reciprocation between a lumber engaging position and a normally retracted position sufficiently above the conveyor to permit lateral movement of lumber onto the conveyor, and operating means connected to the wheel and extending to the infeed end of a saw or the like for moving the wheel downward into engagement with lumber deposited on the conveyor, whereby to provide control of lumber return by the operator stationed at said infeed end.

2. For use with a saw or the like having infeed and outfeed sections, a lumber return system comprising an elongated unpowered conveyor adapted to be positioned adjacent and substantially parallel to the infeed and outfeed sections of a saw or the like, a power driven rotary traction wheel supported above the conveyor for vertical reciprocation between a lumber engaging position and a retracted position sufficiently above the conveyor to permit lateral movement of lumber onto the conveyor, resilient retracting means operatively engaging the wheel and maintaining the latter normally in said retracted position, and operating lever means connected to the wheel and extending to the infeed end of a saw or the like for moving the wheel downward into engagement with lumber deposited on the conveyor, whereby to provide control of lumber return by the operator stationed at said infeed end.

References Cited in the file of this patent
UNITED STATES PATENTS

| 811,009 | Walton | Jan. 30, 1906 |
| 1,933,037 | Zanatto | Oct. 31, 1933 |
| 2,694,482 | Masengill | Nov. 16, 1954 |

FOREIGN PATENTS

| 139,888 | Switzerland | July 16, 1930 |
| 771,668 | France | July 30, 1934 |